United States Patent

[11] 3,627,996

[72] Inventor Hervey E. Vigour
Waynesboro, Va.

[21] Appl. No. 709,368

[22] Filed Feb. 29, 1968

[45] Patented Dec. 14, 1971

[73] Assignee General Electric Company

[54] BUFFER MEMORY FOR DIGITAL EQUIPMENT HAVING VARIABLE RATE INPUT
19 Claims, 11 Drawing Figs.

[52] U.S. Cl. .......... 235/92 GC, 356/106, 235/92 EA, 235/92 EV, 235/92 R, 235/92 CP, 340/173

[51] Int. Cl. .......... G06m 3/00

[50] Field of Search .......... 235/92 (65), 92 (66), 92 (55), 92 (54), 92 (63), 92 (28), 92 (29 G), 92 (29 D), 75, 151.11, 154, 152; 356/106

[56] References Cited

UNITED STATES PATENTS

| | | | |
|---|---|---|---|
| 3,505,503 | 4/1970 | Quiuy | 235/92 |
| 2,810,520 | 10/1957 | Paulsen | 235/92 |
| 3,099,777 | 7/1963 | Davis | 235/92 |
| 3,183,421 | 5/1965 | Herchenroeder | 235/92 |
| 3,272,971 | 9/1966 | Klinikowski | 235/92 |
| 3,407,288 | 10/1968 | Reiser | 235/92 |

*Primary Examiner*—Maynard R. Wilbur
*Assistant Examiner*—Joseph M. Thesz, Jr.
*Attorneys*—William S. Wolfe, Gerald R. Woods, Frank L. Neuhauser, Oscar B. Waddell and Joseph B. Forman

ABSTRACT: A digital buffer memory is described for accumulating the variable rate, reversible polarity, digital fringe count signal pulses of an interferometer position gauging device. The buffer memory comprises a digitally operable, reversible decade counter for accumulating a count indicative of the net sum of the input fringe count pulses supplied from an interferometer position gauging device. A count recognition circuit is coupled to the decade counter for classifying the account accumulated in the reversible counter within the scaling ranges of units, tens or hundreds. Readout circuits are responsive to the count recognition circuit for reading out the count accumulated in the decade counter in scales of units, tens or hundreds as determined by the setting of the counter recognition circuit, and count correction feedback circuits are provided which are responsive to the count recognition circuit and are coupled back to the reversible counter for correcting the count registered in the reversible counter so that the contents of the counter correctly represent only the remaining unprocessed input fringe count signal pulses.

INVENTOR.
HERVEY E. VIGOUR
BY Michael Masnik
HIS ATTORNEY

INVENTOR.
HERVEY E. VIGOUR
BY Michael Masnik
HIS ATTORNEY

INVENTOR.
HERVEY E. VIGOUR
BY *Michael Masnik*
HIS ATTORNEY

INVENTOR.
HERVEY E. VIGOUR
BY Michael Masnik
HIS ATTORNEY

INVENTOR.
HERVEY E. VIGOUR
BY Michael Masnik
HIS ATTORNEY

INVENTOR.
HERVEY E. VIGOUR
BY Michael Masnik
HIS ATTORNEY

INVENTOR.
HERVEY E. VIGOUR
BY Michael Masnik
HIS ATTORNEY

BUFFER MEMORY FOR DIGITAL EQUIPMENT HAVING VARIABLE RATE INPUT

BACKGROUND OF INVENTION

1. Field of Invention

This invention relates to a buffer memory for digital equipment such as a numerical controlled machine tool for use where the input data supplied to the equipment is arriving at a variable rate and it is desired temporarily to store the data until it can be processed by the digital equipment at its normal operating rate.

More particularly, the invention relates to a digital buffer memory for accumulating the variable rate, reversible polarity, digital fringe count signal pulses of an interferometer position gauging device for supply to a digitally operable, numerically controlled machine tool, and for supplying the input fringe count pulses either one fringe count input signal pulse at a time, or in predetermined groups of input signal pulses simultaneously (10 at a time, 100 at a time) for processing by the numerically controlled machine tool in equivalent groups at its normal operating rate.

2. Description of Prior Art

In copending U.S. Pat. application Ser. No. 709,387 entitled "Conversion Apparatus for Converting Nonstandard Pulse Count to Standard Measurement Count," filed concurrently with this application, L. U. C. Kelling, inventor, assigned to the General Electric Company, a conversion apparatus is described for converting the randomly occuring, variable rate, reversible polarity fringe count signal pulses produced by an interferometer position gauging device into a count of known measurement units. To effect this conversion, the apparatus multiplies the incoming fringe count signal pulses by some known conversion constant such as $3.1142697\times10^{-6}$ inches for normal ambient operating conditions or some different equivalent conversion constant for operation in the metric system. The processing time required to effect the multiplication necessarily requires a finite period of time which could result in limiting the operations of the digital equipment with which the conversion apparatus is used.

For example, if the digitally operable equipment controlled by the conversion apparatus constitutes a numerically controlled machine tool, it may be desirable to operate the machine tool over a wide range of machining speeds. The finite processing time required to complete the mathematical processing necessary to accomplish the above-mentioned conversion conceivably could prohibit operation at higher machining speeds. The buffer memory comprising the present invention is designed for use with a conversion apparatus that is capable of overcoming this prohibition so as to allow higher processing speeds. This is accomplished by including in the conversion apparatus a feature which allows conversion selectively to take place either in a scale of one operation, or in conversion operations having higher scaling factors such as scale of 10, or scale of 100 wherein either one at a time or multiple numbers of fringe count signal input pulses (10 at a time, 100 at a time) are converted simultaneously. Such a conversion apparatus is described more completely in copending U.S. Pat. application Ser. No. 709,433 L. U. C. Kelling, inventor, filed concurrently with this application, entitled "Numerical Conversion Apparatus for Interferometer Position Transducer," and assigned to the General Electric Company.

The buffer memory comprising the present invention is designed to overcome the above-described problems by accumulating the preprocessed, input fringe count signal pulses in a reversible counter which can count up and back down, and delivers a net sum to a readout circuit indicative of total accumulated count at a particular instant of time. The buffer memory also is capable of delivering at its output, signal pulses representative of units of input fringe count pulses, or other prearranged groups of input pulses such as 10 or 100 pulses at a time, together with a signal to shift the constant one or two places when appropriate (based on the contents of the reversible counter) so as to enable the digital equipment which it supplies to process single input pulses of 10 or 100 input pulses at a time. In addition, the invention also includes means for appropriately correcting the count contained in the reversible counter subsequent to reading out 1, 10 or 100 accumulated input fringe count pulses, in order that the contents of the counter correctly represent only the remaining unprocessed input signal pulses.

It should be noted at this point in the description, however, that the buffer memory comprising the present invention is not limited to use only with the particular conversion apparatus described in the above-identified copending Kelling application Ser. No. 709,433, nor is it limited to use in the processing of fringe count signal pulses of an interferometer position measuring device. On the contrary, the buffer memory of the invention may be employed in connection with any general buffer storage problem encountered by numerically controlled equipment capable of variably scaled operation, where the term "numerically controlled equipment" is intended to include any digitally operable, numerically controlled apparatus such as a general purpose digital computer, machine tool readout for display, sensor or guidance control systems employing digitized signals, machine tool controls, etc.

SUMMARY OF THE INVENTION

It is therefore a primary object of the present invention to provide a new and improved buffer memory for digital equipment of the type having a variable rate input.

Another object of this invention is to provide an improved signal processing arrangement.

Another object of the invention is the provision of such a buffer memory which is capable of supplying at its output signal pulses representative of units of input fringe count pulses or other prearranged groups of input pulses such as 10 or 100 pulses at a time together with a signal to shift the constant one or two places when appropriate (based on the contents of the reversible counter) so as to enable the digital equipment which it supplies to process one input pulse at a time, or 10 or 100 input pulses at a time.

Still another object of the invention is the provision of a buffer memory having the above characteristics which includes means for correcting the count contained in a reversible counter subsequent to reading out 1, 10 or 100 accumulated input fringe count pulses, in order that the contents of the counter correctly represent only the remaining unprocessed input signal pulses; and which is capable of accurately storing and supplying variable rate input signal pulses to a digital processing equipment for subsequent processing by the equipment at its normal rate of operation.

In practicing the invention, a digital buffer memory is provided for accommodating a variable rate digital input signal to be supplied to digital processing equipment for processing. The buffer memory comprises a digitally operable counter for accumulating the input variable rate digital input pulses and count recognition circuit means coupled to the counter for classifying the count accumulated in the counter within prescribed numerical ranges. Readout circuit means are responsive to the count recognition circuit means for reading out the count accumulated in the counter either bit by bit or in prearranged groups of bits as determined by the setting of the counter recognition circuit. Count correction feedback circuits are provided which are responsive to the count being read out of the counter, and are coupled back to the counter for correcting the count registered in the counter either bit by bit or prearranged groups of bits in accordance with the data read out of the counter. The digitally operable counter preferably comprises a reversible counter, and the memory further includes positive and negative sign indicating logic circuits responsive to the variable rate digital input signal for indicating whether the variable rate input signals are to be added or subtracted from the contents of the reversible counter. The positive and negative sign indicating logic circuits also include means responsive to the count accumulated in the reversible counter for indicating whether the count being read out is to be added or subtracted by the digital processing equipment supplied from the digital buffer memory.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF THE PREFERRED EMBODIMENT

Figure 1:
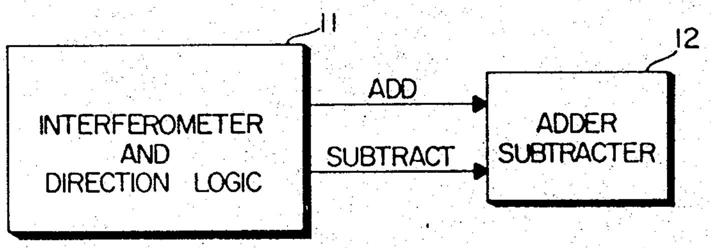
FIG. 1 is a simplified functional block diagram illustrating the problems to be solved, and how the problem arises in connection with existing equipment.
Figure 2:
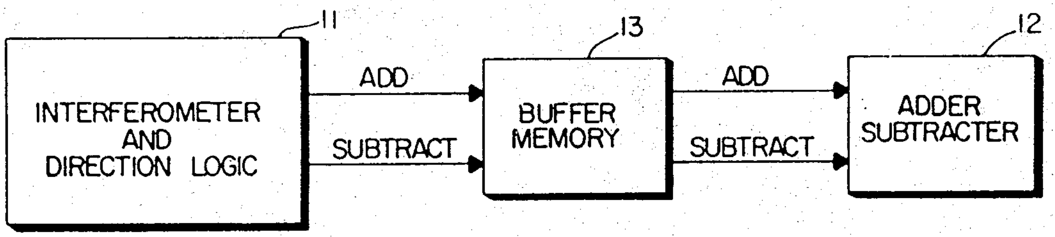
FIG. 2 is a functional block diagram illustrating broadly the manner in which the buffer memory comprising the invention is employed in the arrangement shown in FIG. 1.

The above-identified copending U.S. Pat. application Ser. No. 709,387 of Kelling described a laser interferometer "-fringe to inch" conversion apparatus whereby detection of a numerically controlled machine tool movement is achieved by the production of interferometer fringe count optical increments. The optical increments cause a number in a position register to be updated by the addition or subtraction of a conversion constant so that the total accumulated count in the position register represents the position of the machine tool in known measurement units such as inches or centimeters. FIG. 1 of the drawings illustrates the combination of an interferometer position measuring device together with suitable direction logic circuitry 11 for producing add and subtract count signal pulses that are supplied to an adder-subtractor 12 of an overall conversion apparatus (not shown). The add or subtract signals supplied from the interferometer and direction logic 11 are generally in the form of a digitized voltage pulse of either positive or negative polarity. For the purpose of simplification, only the add pulses will be considered; however, the following remarks will apply equally well to the subtract pulses. Regardless of its exact form, the add pulses occur at a random time having no synchronous relationship to the clock signals or timing signals existing in the control system of which the adder-subtracter is a part. The timing of the input fringe count add pulses is random because this signal is initiated by motion of the machine tool being controlled and is unrelated to the timing signals. Since a serial type of adder-subtracter will in general require a number of clock periods for a complete arithmetic cycle, the use of some type of buffer storage shown at 13 in FIG. 2 is required in order to store the incoming fringe count signal pulses temporarily until they can be utilized by the adder-subtracter of the conversion apparatus.

Where a simple filp-flops or a shift register is used as the buffer storage 13 for a short time storage of the input fringe count pulses, a second problem arises which is related to the speed of computation. As stated previously, some finite time is required to complete one addition or subtraction operation. If each add pulse produces a corresponding addition operation, a calculable upper limit is set for the machine speed. For example, if the time required to carry out one adding operation is 20 microseconds, and the conversion constant being added for each input increment is $3.11\times10^{-6}$ inches, the maximum machine speed is $3.11\times10^{-6}$ inches for each 20 microseconds or 9.33 inches per minute. Thus, the upper speed range of the machine would be limited by the speed of the arithmetical unit (adder-subtracter 12).

In order to increase the upper limit of the speed of a machine tool or other digitally controlled equipment used with the conversion apparatus, in accordance with the invention, the conversion constant is multiplied by 10 or 100 by shifting it one or two places in the decimal storage register before adding it to the position register. By thus adding the conversion constant in at 10 or 100 times its normal value, the machine limitation set by the finite addition time may be increased by a factor of 10 or 100. In order to properly control the multiplication by 10 or multiplication by 100 addition process, buffer storage of 10 or 100 or more add pulses is needed in order that the fast arriving, variable rate incoming fringe count pulses can be properly accumulated while the adder-subtracter 12 is still occupied with processing a previously accumulated batch of input fringe count signal pulses.

Figure 3:
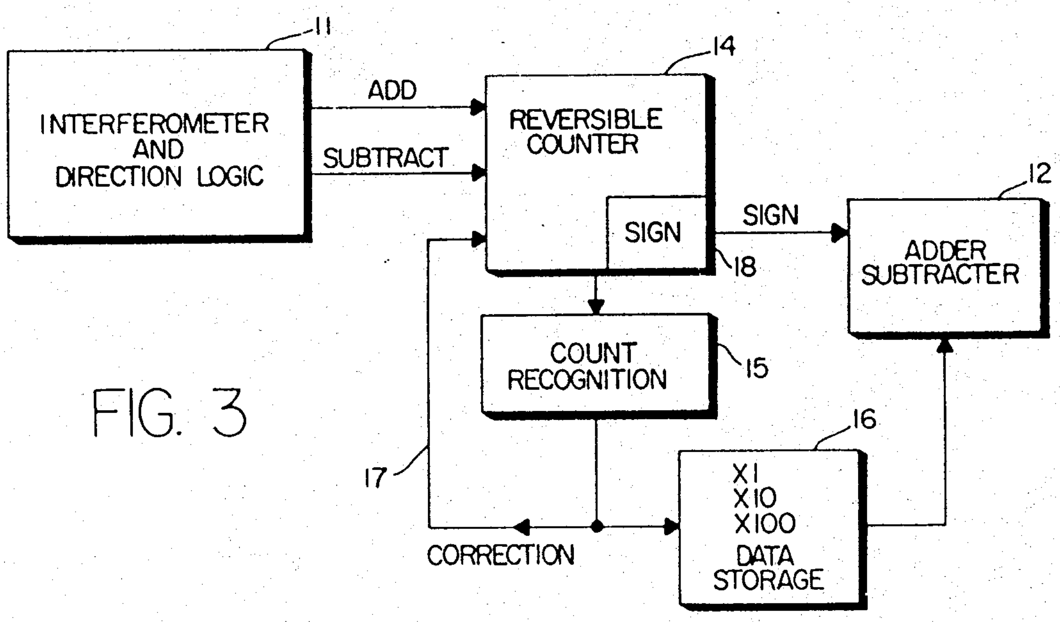
FIG. 3 is a more detailed functional block diagram of the new and improved buffer memory comprising the present invention.

FIG. 3 of the drawings illustrates a digital buffer memory constructed in accordance with the invention which overcomes the above problem, and which employs a reversible counter 14. The output of the reversible counter 14 is supplied through a count recognition circuit means 15 to an integrate by 1, 10 or 100 readout circuit means comprised by a data storage circuit 16 that in turn has its output supplied to the adder-subtracter 12 as a multiplying or shifting modifier of the actual input which is the distance corresponding to a single count. The count recognition circuit means 15 also supplies a feedback correction signal back through the path 17 to the reversible counter 14 for correcting or updating the count accumulated in the reversible counter. The reversible counter 14 also includes a sign indicating circuit shown at 18 for supplying a sign signal to the adder-subtracter 12 to tell it whether to add or to subtract the input signal supplied to it from the integrate by 1, 10 or 100 readout data storage circuit 16.

In operation, the count recognition circuit means 15 classifies the count accumulated in the reversible counter 14 into appropriate decades of units, tens or hundreds, and supplies a suitable readout signal to the integrate by 1, 10 or 100 readout data storage circuit means 16 to cause it to instruct the adder-subtracter 12 to add the conversion constant at either 1, 10 or 100 times its value in performing its next conversion operation. Concurrently with this operation, the count recognition circuit 15 supplies a correction feedback signal through the conductor 17 back to reversible counter 14 to correct the reversible counter 14 so that its contents represent only the remaining unprocessed input fringe count signal pulses. Along with the above operations, a sign signal is supplied from the sign indicating circuit 18 to the adder-subtracter 12 to instruct it whether to add or subtract the data signal pulses being supplied to it from the readout data storage circuit 16.

From the foregoing description, it will be appreciated that the reversible decade counter 14 is used as a buffer storage element between the interferometer and direction logic circuit 11 and the adder-subtracter 12. The use of the reversible decade counter and the other coacting circuit element shown in FIG. 3, solves the two problems described previously; namely, provision of a means for accumulating the randomly occurring add and subtract pulses which cannot be immediately processed by the adder-subtracter, and at higher speeds when 10 or more incoming fringe count pulses occur in rapid sequence during a period when the adder-subtracter is occupied in completing an earlier add-subtract cycle, the rapid occurring incoming fringe count pulses are not disregarded but are properly stored for subsequent processing by the adder-subtracter. The suitability of the reversible counter 14 as a buffer storage is based in part on the nature of the incoming, variable rate, reversible polarity interferometer fringe count signal pulses. Inherently, the add-subtract fringe count pulses do not occur exactly simultaneously; however, they may be intermixed in rapid sequence especially if machine vibration is present. For processing incoming signals of this nature, the reversible counter 14 is most satisfactory since it can count up and back down and deliver a net sum at its output.

The novelty of the buffer memory shown in FIG. 3 of the drawings lies in its ability to extract accumulated counts in batches of 10 or 100 (or a single count) according to the magnitude of the count existing in the reversible counter. If the count accumulated in the reversible counter 14 exceeds 100, at the beginning of a readout cycle, it will be reduced by 100 during the next readout, and simultaneously a command for the adder-subtracter 12 is prepared telling it to shift the constant by two places and add it to the position register at 100 times its normal value. If the count accumulated in the counter 14 is between 10 and 99 at the beginning of a readout cycle, the count will be reduced by 10 and the adder-subtracter command will be to shift the constant one place and thereby add it to the position register at 10 times it normal value. If the count is between 1 and 9 at the beginning of a readout cycle, it will be reduced by 1, and the adder-subtracter 12 is commanded to add the constant at its normal value. Thus, it will be seen that while the interferometer fringe count signals produced by the machine motion are acting to fill up reversible counter 14, the remainder of the system attempts to empty the counter down to a zero state, resorting as necessary to extracting counts in batches of 10 or 100 to do so, while simultaneously updating the position register count and the reversible counter count so as to keep them approximately at the correct value at all times. During high speed machine motion, the position register content will be behind the true machine position as measured by the interferometer position measuring device by the amount represented by the contents of the reversible counter 14. At top speeds, this may be typically 200 counts maximum or about 0.0006 inch. As the machine slows down, the lag becomes less and less until at standstill the reversible counter is empty and the position register accurately depicts the true machine position.

From the foregoing description, it will be appreciated that the major objectives of the buffer memory comprising the invention are to provide a buffer storage for add or subtract fringe count pulses occurring at times when they cannot be immediately processed, to combine a mixed sequence of add and subtract fringe count pulses into a single net sum or count, and to produce, store and deliver commands to the adder-subtracter (including signals to shift the constant one or two places when appropriate on the basis of the contents of the counter) so as to process 1, 10 or 100 pulses at a time. The buffer memory also includes means for appropriately correcting the count contained in the reversible counter by 1, 10 or 100 counts simultaneously with the commands produced for the adder-subtracter, in order that the contents of the counter correctly represent only the remaining unprocessed pulses. The design of the memory is such as to insure correct operation of the reversible counter by making corrections of 1, 10 or 100 counts only during operating periods when the counter is not otherwise occupied in accepting normal add or subtract input fringe count pulses from the interferometer position measuring device.

System LOGIC CIRCUIT DETAILS

Figures 4, 4A, 4B:
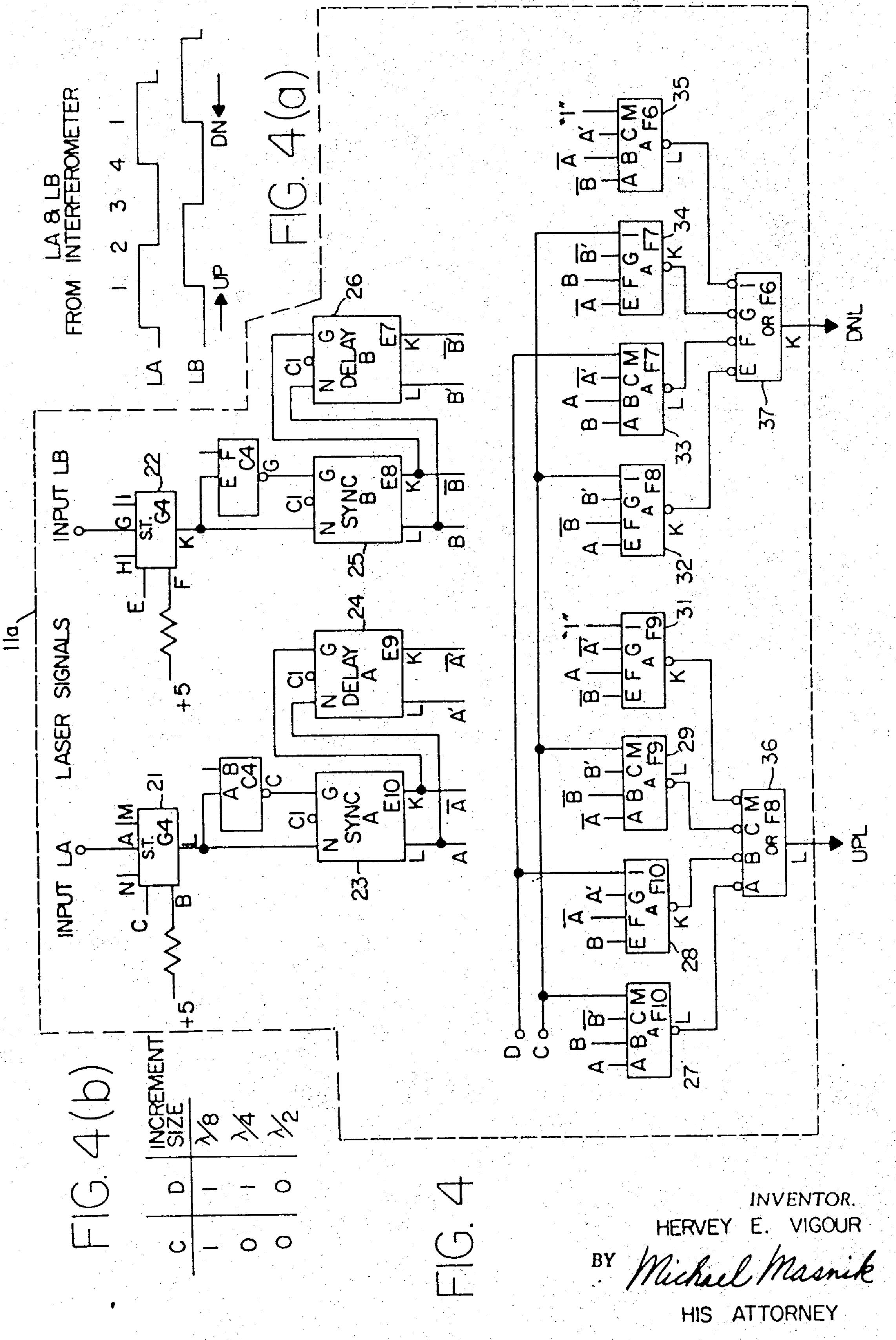
FIG. 4 is a detailed logical circuit diagram of a preferred form of the buffer memory comprising the present invention.
Figure 4:
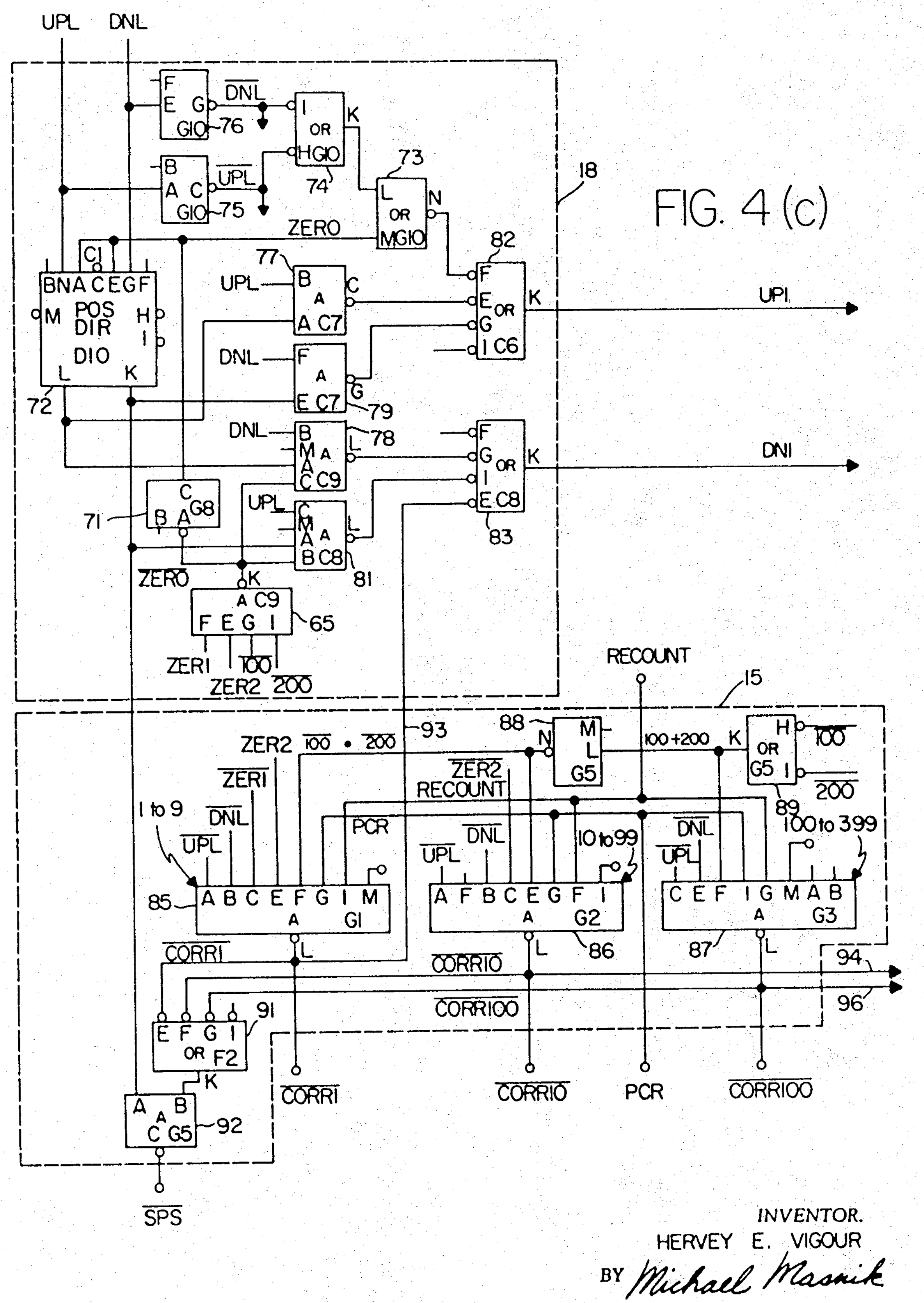
Figure 4D:
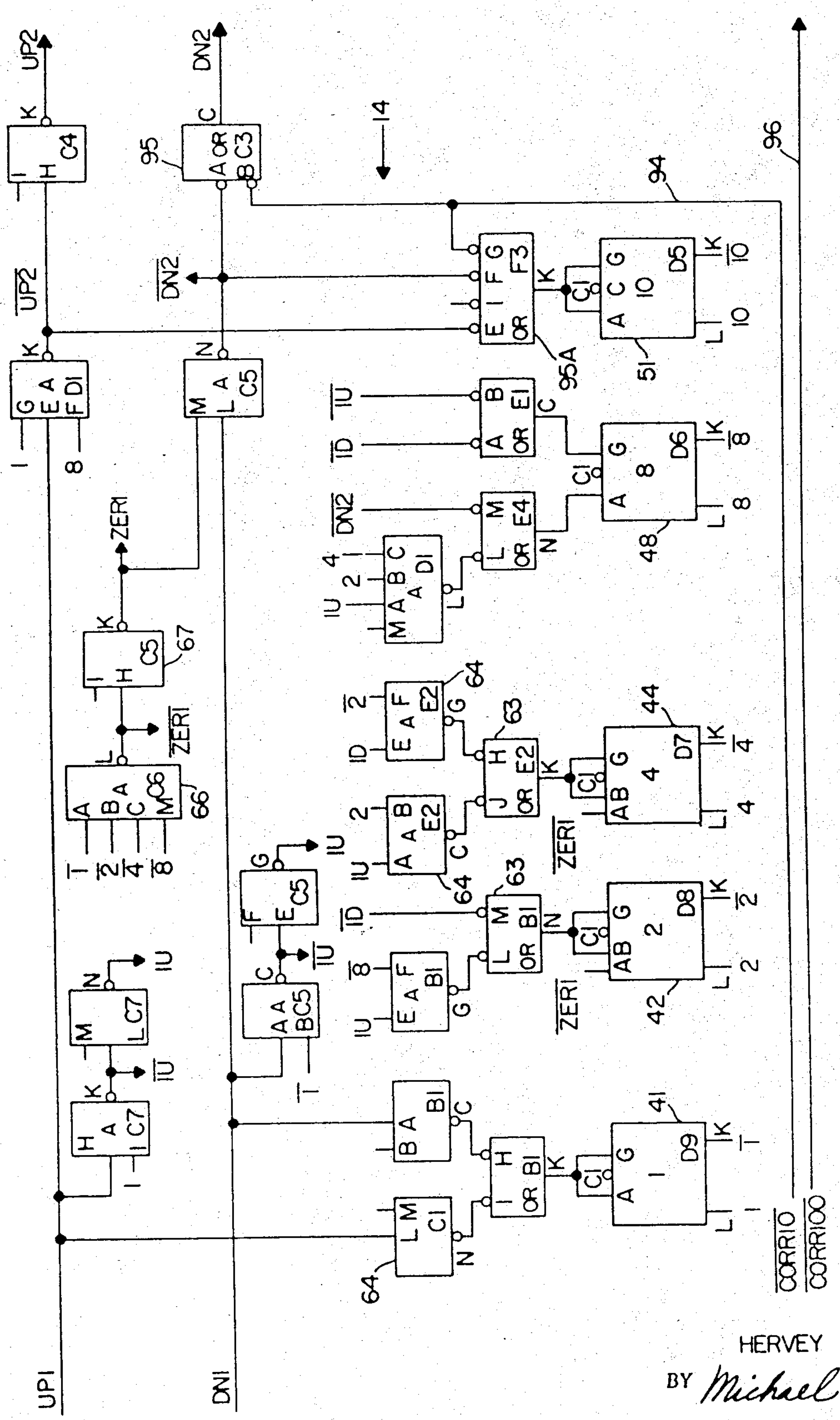
Figure 4E:
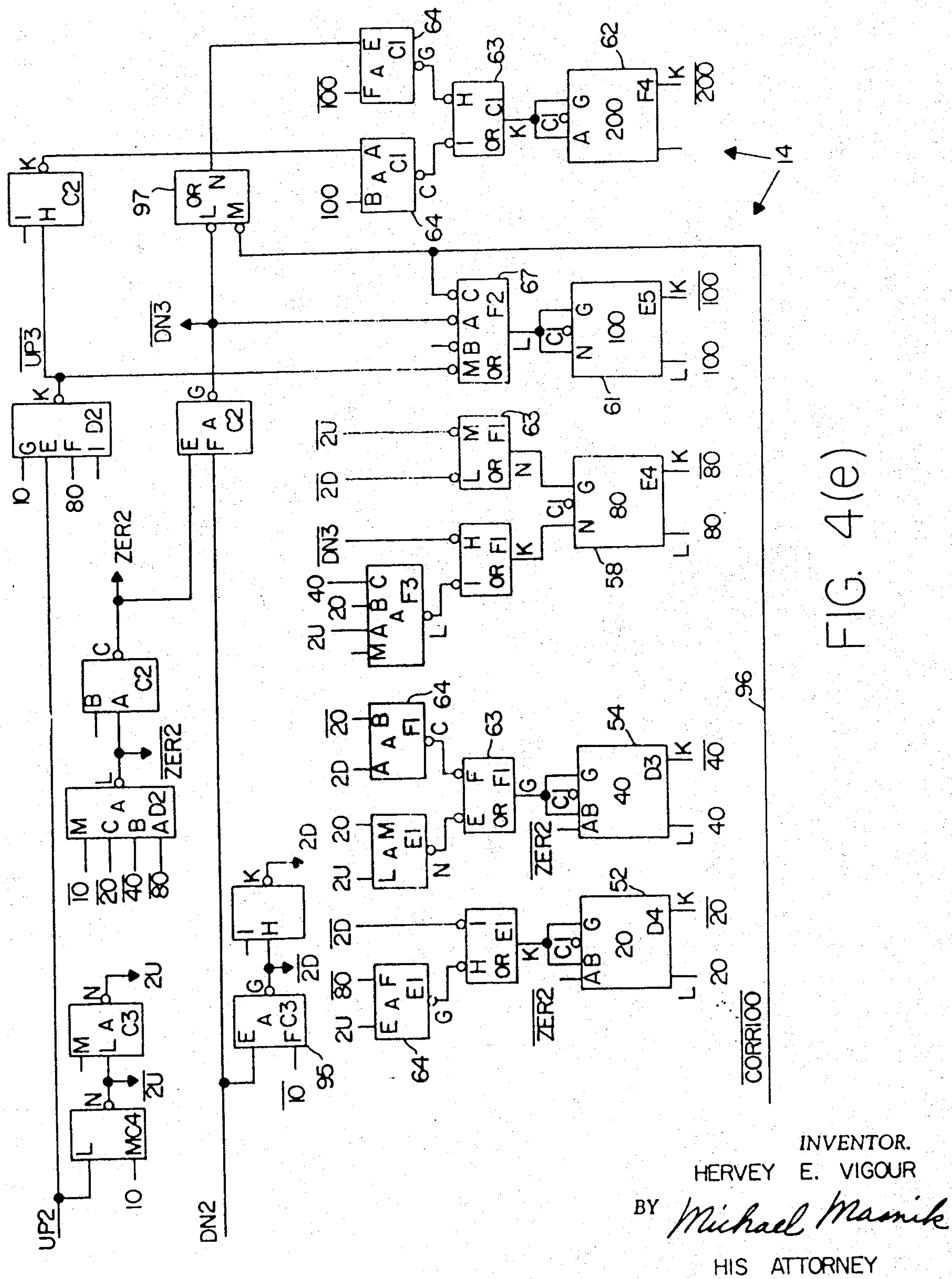
Figure 5:
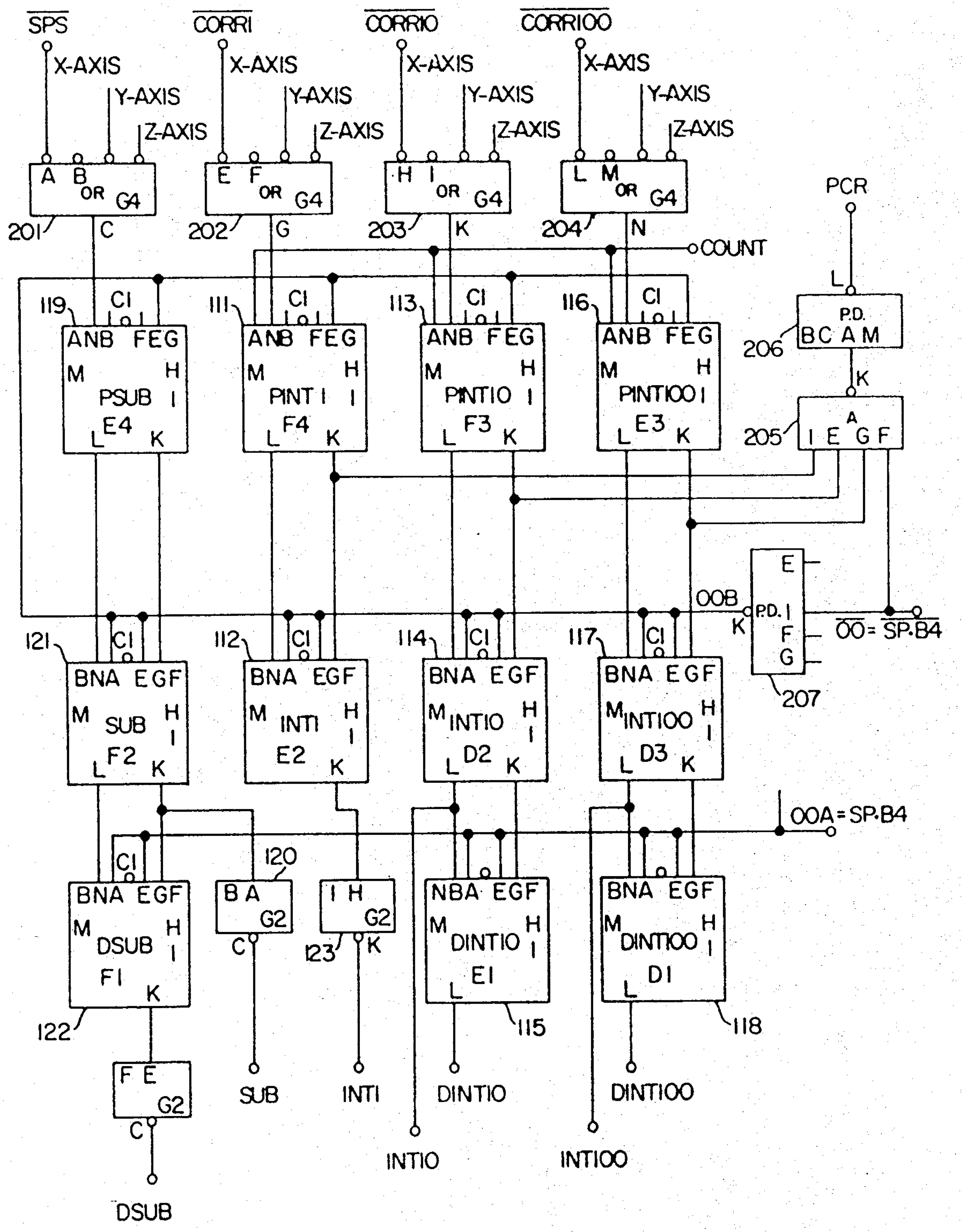
FIG. 5 is a detailed logical circuit diagram of a data storage network also comprising a part of the buffer memory shown in FIG. 3.
Figure 6:
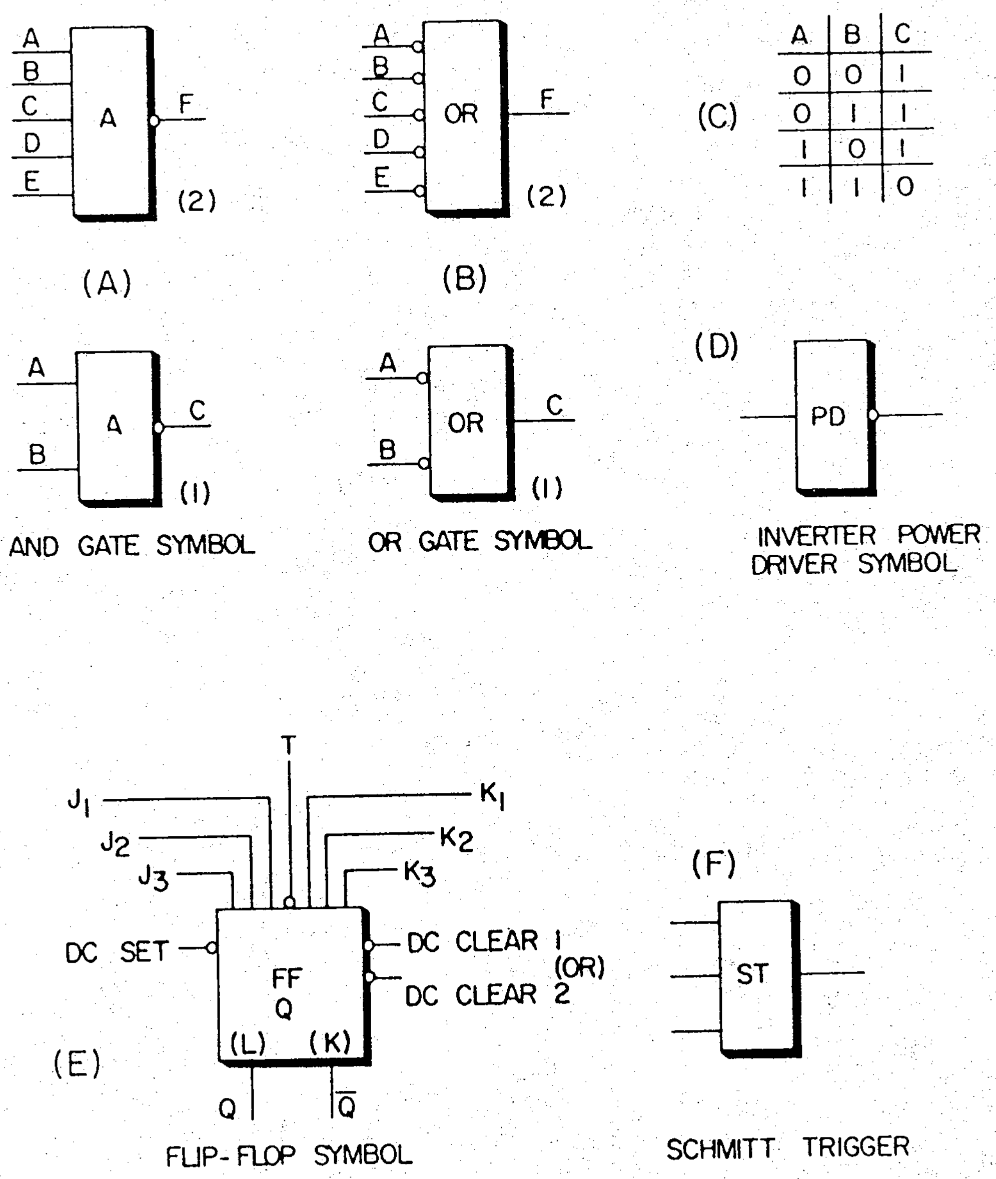
FIG. 6 of the drawings illustrates logical circuit element symbology.

A detailed logical circuit diagram of a buffer memory constructed in accordance with the invention is shown in FIGS. 4 and 5 of the drawings. Before proceeding with the description of detailed logic circuitry, however, it is believed desirable to review the logical circuit element symbology employed in depicting the several circuit elements that comprise the system shown in FIGS. 4 and 5. FIG. 6 of the drawings illustrates this logical circuit element symbology. FIG. 6A(1) and (2) illustrate the symbols employed for AND gates wherein FIG. 6A(1) is a two input AND gate and FIG. 6A(2) is a five input AND gate. These symbols are employed to denote an AND gate although the number of inputs to the gate may vary. While these gates are called AND gates, they are in fact inverting AND gates which cause an inversion of the input signals supplied thereto. All AND gates to be permissive must have a logic "1" (plus 3.8 volts) enabling signal supplied to all their inputs in order to produce a logic "0" output signal (0 volts). These characteristics are present regardless of the number of input terminals to the AND gate.

FIG. 6(C) of the drawings is a truth table for the two input AND gate shown in FIG. 6A(1). From an examination of this truth table, it will be seen that there is an inversion produced by the gate between the input and output terminals which is depicted by a small circle appearing at the output terminal C. The truth tables for AND gates having greater numbers of input terminals is essentially the same as that shown for the two input AND gate wherein to produce a logical "0" at the output terminal C, all of the input terminals of the AND gate must be supplied with a logical one "1" input signal.

FIGS. 6(B)(1) and (2) illustrate the logical symbols used for a two input and a five input OR gate respectively which, similar to the AND gates, are inverting OR gates. The truth table for the two input OR gate shown in FIG. 6B(1) is the same as that shown for the two input AND gate of FIG. 6A(1) as shown in FIG. 6(C). Hence, it will be appreciated that identical circuit structures may be used either as AND gates or as OR gates depending upon the nature of the signals supplied to their inputs. All of the AND gates and OR gates employed in the present invention are of conventional construction and generally are fabricated in integrated circuit form. This is also true of other circuit structures such as the inverter power driver shown in FIG. 6(D). The inverter power driver shown in FIG. 6(D) can comprise a one input AND or OR gate, and is used in a circuit as a power driver and to achieve an inversion of the signal supplied therethrough.

All of the flip-flop memory units employed in the buffer memory are conventional J–K flip-flops depicted in FIG. 6E which possess the characteristic of being capable of being switched from one state to the other in response to input steering signals supplied to the set (J) and the reset (K) input terminals. Upon an enabling logic "1" potential being supplied to either the J or K input steering terminal, the J–K flip-flop will switch to whichever state the input steering renders permissive at the next input clock signal pulse. The input clock signal pulses denoted C–1 are applied to the trigger (T) input terminal of the flip-flop and switching occurs when the C–1 clock signal goes from a logic "1" to a logic "0" level. In addition, if both the set steering and the reset (clear) steering are made permissive at the same time, the J–K flip-flop assumes it opposite state when triggered.

FIG. 6E of the drawings is a schematic functional block diagram showing the input connections to a J–K flip-flop. If no inputs to a steering terminal are shown, it can be assumed that this terminal is tied to a logic "1" (plus 3.8 volts) supply terminal. The inversion indicated at the trigger input (T) denotes that an inverted or logic zero signal is required to trigger the J–K flip-flop. The DC set input signal and either DC clear input signal must be inverted as shown by the inversion indicators at each of these inputs. The set steering "J" and the clear or reset steering "K" each consist of three-input AND gates. The J–K flip-flops thus comprised are standard commercially available circuit structures which can be obtained in integrated circuit form and interconnected in the manner hereinafter described to provide the memory functions desired. For a more detailed description of the characteristics of J–K flip-flops, reference is made to the textbook entitled "Logical Design of Digital Computer," Montgomery Phister, author, John Wiley Publishing Company.

FIG. 6F of the drawings illustrates the circuit symbology employed to indicate a Schmitt trigger circuit configuration which in actuality constitutes a noninverting three-input AND gate that may be used as a pulse shaper.

FIG. 4 of the drawings is a detailed logical circuit diagram of the direction logic circuitry (shown in the dotted outline box at 11*a*), the decade reversible counter 14, and the count recognition gates shown in the dotted outline box at 15. The direction logic circuitry is comprised by a pair of Schmitt trigger wave shaping circuits 21 and 22 which have the substantially square wave shaped signals shown at $\angle A$ and $\angle B$ in FIG. 4(A) supplied to the inputs thereof respectively from an interferometer position gauging device. Whether or not the input signal pulses supplied at LA and LB to the Schmitt triggers 21 and 22 in the direction logic are to be added or subtracted is determined by the phase relation of these two signals. In the event that the square wave shaped signal $\angle A$ leads the square wave shaped signal $\angle B$ in phase, the input signal pulses are considered to be in the positive or "up" direction and hence are to be added. On the contrary, if the square wave shaped signals $\angle B$ precede or lead in phase the square wave shaped signals $\angle A$, the signal pulses are considered to be in the negative or "down" direction, and hence are to be subtracted from the contents of the reversible counter. The bidirectional input signals LA and LB are provided in this form by appropriate design of the interferometer.

In order to convert the input LA and LB interferometer fringe count signal pulses into separate positive and negative polarity trains of pulses, the direction logic circuitry 11*a* includes four sync and delay flip-flops 23, 24 and 25, 26, connected respectively to the outputs of the A Schmitt trigger 21, and the B Schmitt trigger 22. The outputs of the flip-flops 23 through 26 are connected to three input terminal of respective ones of eight four-input AND-gates 27 through 35. The remaining input terminals of the AND-gates 27 through 34 are connected to the two input enabling potentials C or D for adjusting the AND-gate 27–34 to accommodate a desired fringe count increment size as shown by the truth table illustrated in FIG. 4(B). The outputs of the AND-gates 27 through 31 are connected to a four-input OR-gate 36 and the output of the four AND-gates 32 through 35 are connected to the inputs of a four-input OR-gate 37. OR-gates 36 and 37 provide at their outputs the desired, preprocessed, opposite polarity fringe count signals UPL and DNL, respectively.

The operation of the direction logic circuitry 11*a* is relatively straightforward in that the square wave interferometer position measuring device input signals A and B are first shaped by the Schmitt trigger wave shaping circuits 21 and 22 and applied to the synchronizing flip-flops 23 and 25, respectively, to develop the output signals A, $\bar{A}$, B and $\bar{B}$. The delay flip-flops 24 and 26 have their input set and reset steering terminals connected directly to the set and reset output terminals of the flip-flops 23 and 25, respectively so as to provide delayed outputs A', $\bar{A}'$, B' and $\bar{B}'$. The outputs from the flip-flops 23 through 26 are applied in the manner shown in FIG. 4 to the respective inputs of the AND-gates 27 through 35 along with a desired increment size enabling potential supplied over supply terminal C and D. As determined by these potentials, the AND-gates 27 through 35 will provide output gating pulses UPL and DNL through the outputs of the OR-gates 36 and 37 in response to the input square wave shaped signals A and B. The nature of the UPL and DNL signals are such that they will go to the logic "1" state for 1 clock period when the machine being controlled moves one increment in the positive or negative direction, respectively.

The input fringe count pulses UPL and DNL are supplied through the sign storage and control circuit 18 which stores the sign of the counter contents and determines whether the input pulses are to be added or subtracted from the contents of the reversible counter 14. To simplify the count recognition circuits, the decade reversible counter employed in the buffer memory instead of counting down through zero in the usual fashion of a three decade counter without sign, counts down to and back up from zero with the positive or negative sign stored as the state of a sign indicating flip-flop. For example, a conventional three decade counter without sign would count down 003, 002, 001, 000, 999, 998, etc. In contrast to the three decade counter without sign, the reversible counter used in the buffer memory employs a sign indicating flip-flop so that it counts down 003, 002, 001, 000, −001, −002, with the minus sign being indicated by the state of a sign indicating flip-flop comprising a part of the system. As a consequence of this arrangement, a gate circuit which recognizes a count of +1 through +9, for instance, also serves to recognize the count of −1 through −9. The state of the sign flip-flop determines whether the arithmetic operation is to be an addition or a subtraction. For a more detailed description of the construction and operation of such decade counters, reference is made to any of the issued patents or technical publications relating to this art. For example, see U.S. Pat. No. 3,120,603 issued Feb. 4, 1964 for the description of a suitable reversible counter construction that could be employed as counter 14. Briefly, however, the reversible counter 14 is comprised of a plurality of 1, 2, 4, 8 coded interconnected flip-flop memory element 41, 42, 44, 48, 51, 52, 54, 58, 61 and 62 whose input steering terminals are controlled by the outputs of a plurality of control OR gates shown generally at 63 whose inputs in turn are supplied from the outputs of a number of control AND gates shown generally at 64. The AND-gates 64 in turn are controlled from the UPI and DNI supply terminals, respectively, that are supplied with up and down count signal pulses from the sign indicating circuit 18 in response to the input UPL and DNL fringe count signal pulses. In operation, the reversible counter 14 functions to accumulate a net count of all the UPL and DNL fringe count pulses that is represented by the output potentials 1, $\bar{1}$, 2, $\bar{2}$, 4, $\bar{4}$, etc. appearing at the set and reset output terminals L and K, respectively, of all the flip-flop memory units 41 through 62. It is through the sampling of these output count potentials stored in the reversible counter 14 that the count recognition gates 15 operate, and also the positive or negative sign indicating circuit 18 likewise is controlled.

The positive and negative sign indicating circuit 18 includes four-input AND-gate 65 having each of its four input terminals connected to enabling potentials ZER 1, ZER 2, $\overline{100}$ and $\overline{200}$, respectively. The ZER 1 enabling potential is developed by a four-input AND-gate 66 and inverter 67 with the four input terminals of the AND-gate 66 being connected to the $\bar{1}$, $\bar{2}$, $\bar{4}$ and $\bar{8}$ potentials appearing at the reset (K) output terminals of the flip-flop memory units 41, 42, 44 and 48 of the first decade of reversible counter 14. From a consideration of this connection, it will be appreciated that the ZER 1 enabling potential goes to a logic "1" only when the contents of the first decade of the reversible counter are zero. In a similar manner, a second four-input AND-gate 68 and power driver inverter 67 are employed to develop the ZER 2 enabling potential in response to the outputs from the second decade of the reversible counter. The $\overline{100}$ and $\overline{200}$ enabling potentials are derived directly from the reset (K) output terminals of the 100 and 200 flip-flop memory units 61 and 62, respectively.

From the above description, it will be appreciated, that whenever the contents of the reversible counter become zero, enabling potentials will be supplied to all of the inputs of the AND-gate 65 so as to produce a logic zero potential at its output in accordance with the truth table shown in FIG. 6(C). This potential is inverted by the inverter 71 and applied as an enabling potential to both the set and reset input steering terminals of a positive direction flip-flop 72. This enabling potential is also applied to one of the input terminals of a zero enabling AND-gate 73 whose remaining input terminal is supplied from the output of an OR-gate 74. OR-gate 74 has its two input terminals connected to the outputs of inverters 75 and 76 which are connected respectively to the UPL and DNL input supply terminals.

The positive direction flip-flop 72 has its set (L) output terminal connected directly to one input terminal of a two-input AND-gate 77, and connected directly to one input terminal of a three-input AND-gate 78. The reset (K) output terminal of positive direction flip-flop 72 is connected directly to one input terminal of a two-input AND-gate 79 and to one input terminal of a three-input AND-gate 81. Each of the two-input AND-gates 77 and 79 have their remaining input terminals connected to the UPL and DNL input signal terminals, respectively. Similarly, the three-input AND-gates 78 and 81 each have one of their remaining input terminals connected directly to the DNL and UPL input gating terminals, respectively. In addition, the three-input AND-gates 78 and 81 have their third input terminal connected directly to the output of the previously mentioned four-input AND-gate 65. The outputs of the AND-gates 73, 77 and 79 are connected through a three-input OR-gate 82 to the UP1 supply terminal of reversible counter 14, and the two AND-gates 78 and 81 have their output terminals connected as two of the inputs of a three-input OR-gate 83 having its output connected directly to the DN1 supply terminal of the reversible counter 14.

In operation, the application of an incremental input pulse or bit to the UP1 supply terminal of reversible counter 14 will cause the counter to add one bit to its content, and the application of an incremental signal pulse or bit to the DN1 supply terminal will cause the reversible counter to subtract one bit from its contents in a conventional manner. The incoming UPL and DNL fringe count signal pulses are supplied respectively either to the UP1 or DN1 supply terminals of the reversible counter by the positive direction flip-flop 72 and the input AND-gates 73, 77, 79, 78 and 81 as determined by the setting of these control AND gates.

As stated earlier, whenever the counter is in the zero state, an enabling potential will be supplied to both the set and reset input steering terminals of the positive direction flip-flop 72 along with an enabling potential applied to the AND-gate 73 from AND-gate 65 and inverter 71. Concurrently, the AND-gates 78 and 81 will be blocked due to the $\overline{\text{ZERO}}$ signal going to a logic "0" level. Thus, at this point in the operation, the flip-flop 72 will be in either one of its two states, but according to whether the next input signal is a UPL or a DNL pulse, the flip-flop will subsequently be either in the set or reset state respectively. The set state of the positive direction flip-flop 72 is considered to indicate positive numbers while the reset or cleared state of this flip-flop has been chosen to indicate negative numbers. For this reason, the reset (K) output terminal of positive direction flip-flop 72 is connected directly to one input terminal of a two-input AND gate in the count recognition circuit 15 for a purpose that will be described more fully hereinafter. For the present, however, it is sufficient to note that the positive direction flip-flop 72 will be enabled by the zero state of the counter to be either set or cleared in response to the next succeeding UPL or DNL input signal pulse (hereinafter referred to as the (0+1) signal pulse). In order not to lose count of this (0+1) signal pulse, it is supplied through either of the power driver inverters 75 or 76 and OR-ate 74, the enabled AND-gate 73 and OR-gate 82 to cause the reversible counter to add one count to its contents. Whether this count that is now recorded in the reversible counter 14 is 001 or −001 is of course determined by the condition of the positive direction flip-flop 72.

From the foregoing description, it will be appreciated that the condition of the flip-flop 72 determines whether or not the contents of the reversible counter 14 shall be considered to be either positive or negative with respect to a zero reference value. For simplicity, assume that the numeral (0+1) signal pulse was a UPL pulse and that the positive direction flip-flop is in its set state. Thus, it will be appreciated that the contents of the reversible counter 14 will then be considered to be positive with respect to the zero or reference value. Setting of the flip-flop 72 will provide enabling potentials to the two-input AND-gate 77 and the three-input AND-gate 78. Because at this time there will be a count registered in the counter 14, the $\overline{\text{ZERO}}$ signal will have gone to the logic "1" value so that the three-input AND-gate 78 can respond to the DNL input signal pulses, and the two-input AND-gate 77 can respond to the UPL input signal pulses. The outputs of each of these AND gates are supplied through the respective OR-gates 82 and 83 to the UP1 and DN1 supply terminals, respectively of the reversible counter to thereafter cause the contents of the counter to count up or back down with respect to the zero reference value. The net count accumulated at any instant of time in the reversible counter 14 will then appear at the output terminals of the flip-flop memory elements 41, 42, etc.

In contrast to the above paragraph, if it is assumed that the (0+1) signal pulse was a DNL pulse, then the positive direction flip-flop 72 would have been reset to its cleared condition thereby indicating that negative numbers are being accumulated in the reversible counter. Here again, in order not to lose the 0+1 signal pulse, it is supplied through the power driver inverter 76, OR-ate 74, AND-gate 73 and OR-gate 82 to cause the reversible counter 14 to count up by 1-bit. At this point, it should be remembered that insofar as the reversible counter 14 is concerned, it counts up from 0 to 1 either for positive or negative numbers, and it is the setting of the positive direction flip-flop 72 which determines whether or not the contents of the counter should be considered to be positive or negative. Resetting of the flip-flop 72 to its cleared condition will provide an enabling potential to one of the input terminals of the two-input AND-gate 79 and to one of the input terminals of the three-input AND-gate 81. Here again, the accumulation of a one-bit count in the counter 14 causes the $\overline{\text{ZERO}}$ signal to go to a logic "1" level so that the three-input AND-gate 81 is enabled to respond to the UPL signal supplied to its third input terminal, and the two-input AND-gate 79 is enabled to respond to the DNL input signals supplied to its remaining input terminal. At his point, it should be remembered that when the contents of the reversible counter 14 are considered to be negative in nature, the DNL pulses will cause an increasing count, and the UPL pulses will cause a decreasing count. Accordingly, the DNL pulses are supplied through AND-gate 79 and OR-gate 82 to the UP1 supply terminal of the reversible counter to cause the count accumulated in the counter to increase. Likewise, the UPL input signal pulses are supplied through the AND-gate 81 and OR-gate 83 to the DN1 supply terminal of the reversible counter to cause the contents of the counter to back down.

The count recognition circuit means 15 is comprised by three count recognition gates 85, 86 and 87 which have supplied thereto outputs from the reversible counter 14 so that they are enabled to recognize counts of 1 through 9, 10 through 99, and 100 through 399, respectively, provided that input enabling potentials are supplied from two other sources. One of these enabling potentials, labeled RECOUNT is a timing signal supplied from the adder-subtracter unit of the digital equipment with which the memory is used, and which permits the count recognition process to occur only during periods appropriate to the normal functioning of the adder-subtracter unit. The second input supplied to all three AND-gates 85, 86, and 87 is labeled PCR and is in the nature of a feedback signal which serves to block further recognition of the counts contained in reversible counter 14, once a particular count has been recognized, for such time as is required to execute the corresponding arithmetic operation related to the particular count that has been recognized. Signals RECOUNT and PCR are connected to all three count recognition gates 85, 86 and 87 and must be in the logic "1" state before any gate can function.

Also common to all three AND-gates 85, 86 and 87 are the enabling signals $\overline{\text{UPL}}$ and $\overline{\text{DNL}}$ developed at the output of the inverters 75 and 76, and whose presence insures that modification of the counts stored in the counter cannot be attempted at the same time that a normal input fringe count signal is being supplied from the laser interferometer through the direction logic circuitry 11*a*. The presence of the $\overline{\text{UPL}}$ and $\overline{\text{DNL}}$ enabling potentials assures that the count recognition and correction process occurs during clock periods when interferometer gauging signals are not being received. This provision is necessary because the reversible counter 14 can respond properly to only one signal source at a time. The RECOUNT permissive signal goes to the logic "1" state at a particular point in an operating cycle of the adder-subtracter unit and extends for a period of 100 clock bits. Therefore, if input fringe count signals UPL or DNL are initially being received during the RECOUNT period, there is ample opportunity to wait for an idle clock period to come along during the 100-bit RECOUNT period during which the count recognition and correction process can take place.

In addition to the above-identified enabling potentials, the count recognition AND-gate 85 has supplied to its input terminals a $\overline{\text{ZER 1}}$ signal, a ZER 2 signal and a $\overline{100 \cdot 200}$ signal supplied from the output of an inverter 88 that in turn is supplied from the output of a two-input OR-gate 89 having its two inputs connected to the $\overline{100}$ and the $\overline{200}$ output terminals, respectively, of the flip-flops 61 and 62 of reversible counter 14. The AND-gate 86 has two of its input terminals connected to the $\overline{\text{ZER 2}}$ and the $\overline{100 \cdot 200}$ signals, and the AND-gate 87 has one of its input terminals connected to the 100+200 enabling potential appearing at the output of the OR-gate 89. As a consequence of these connections, the count recognition AND-gate 85 will function to recognize a count accumulated in the reversible counter 14 which extends between the ranges of 1 and 9, AND-gate 86 recognizes counts between 10 and 99, and AND-gate 87 recognizes counts extending between 100 and 399.

The outputs form all of the count recognition AND-gates 85, 86 and 87 are connected through a three-input OR-ate 91 to one input terminal of a two-input AND-gate 92 which has its remaining input terminal connected directly to the clear output terminal of the positive direction flip-flop 72. As a consequence of this connection, the AND-gate 92 serves to develop at its output to the adder-subtracter unit of the digital equipment with which the memory is used a signal indicating that the data supplied to it from the count recognition gates 15 is either positive or negative in nature as determined by the condition of the positive direction flip-flop 72.

In operation, the count recognition and correction signal appearing at the output of the AND-gate 85 for counts within the range of 1 to 9 appears as a $\overline{\text{CORR 1}}$ signal that is supplied to the readout circuit means 16 shown in greater detail in FIG. 5. In addition, the $\overline{\text{CORR 1}}$ signal is supplied back through a feedback connection 93 to one of the input terminals of the input OR-gate 83 to the DN1 supply terminal of reversible counter 14. Accordingly, upon any of the counts stored in the counter 14 being read out through the count recognition AND-gate 85 as a $\overline{\text{CORR 1}}$ readout signal, this signal will be fed back through the DN1 supply terminal to reduce by 1 the count stored in reversible counter 14 so that it correctly totals up only the count of the unprocessed fringe count signal pulses accumulated up to that point. Similarly, the count recognition AND-gate 86 develops at its output terminal a $\overline{\text{CORR 10}}$ output signal that is supplied back up through a feedback connection 94 to one input terminal of an OR-gate 95 connected to supply the second decade DN2 count pulses to the second decade of the three decade reversible counter 14. In a similar manner, the $\overline{\text{CORR 100}}$ count recognition and correction signal appearing at the output of the AND-gate 87 is supplied back through a feedback connection 96 to one input terminal of a two-input OR-gate 97 that supplies the down count pulses to the partial third decade of the reversible counter 14.

The process of recognizing a count in the counter 14 and storing a command to the adder-subtracter employed with the memory, will now be described in further detail. Assume for simplicity that the enabling potential PCR is permissive, that no fringe count signal is being received from the laser interferometer, and that the time for count recognition has arrived as indicated by the RECOUNT enabling signal going to the logic "1" state. If the count stored in the reversible counter 14 is between the values of 10 and 99, for example, as well it might be with a machine proceeding at a moderate speed, all inputs to the center recognition gate 86 will be permissive and its output goes to the logic "0" level to produce the gate output signal $\overline{\text{CORR 10}}$. The gate output signal $\overline{\text{CORR 10}}$ produces three effects. First, it is connected into the input of the second decade of the counter through the OR-gates 95 and 95A, so that on the subsequent C–1 clock signal, it will count the second and subsequent decades of the counter down by 1 count, thereby effectively reducing the contents of the counter by 10. Secondly, the signal $\overline{\text{CORR 10}}$ is connected through an OR gate to the set steering of a flip-flop memory unit PINT 10 (shown in FIG. 5 of the drawings and to be described more fully hereinafter) which becomes set after the next C–1 clock signal to temporarily store the fact that a cycle of either adding or subtracting the constant at 10 times its normal value is to be carried out. Thirdly, the signal $\overline{\text{CORR 10}}$/ acts through the three-input OR-gate 91 to store the sign information supplied by the positive direction flip-flop 72 in the preliminary subtract flip-flop PSUB shown in FIG. 5. The state of this PSUB flip-flop later on determines whether the arithmetic operation carried out by the adder-subtracter is a subtraction or an addition.

The operations of setting the PINT 10 flip-flop shown in FIG. 5 and reducing the stored count by 10 counts are triggered by the same C–1 clock pulse. To prevent any further recognition of the counter state and further modification of its stored count on succeeding clock pulses, the set state of the PINT 10 flip-flop is fed back through a four-input AND-gate 205 and power driver inverter 206 to make the permissive signal PCR go to logic "0" and block the count recognition gates from further operation. The circuit operation as described has resulted in the preliminary flip-flop PINT 10 shown in FIG. 5 being set, the count in the reversible counter 14 being reduced by 10, and the preliminary subtract flip-flop PSUB shown in FIG. 5 to be set or cleared in accordance with whether the positive direction flip-flop 72 was cleared or set, respectively. The operation of the other two count recognition gates 85 and 87 has entirely analogous results, except that the count 1 through 9 AND-gate 85 causes the preliminary flip-flop PINT 1 shown in Fig. FIG. 5 to be set, and the count stored in reversible counter 14 to be reduced by 1. The operation of the 100 through 399 AND-gate 87 causes the setting of the PINT 100 flip-flop, and the count stored in reversible counter 14 to be reduced by 100.

FIG. 5 of the drawings illustrates the construction of the readout circuit means 16 which constitutes a data storage network comprised of interconnected preliminary storage, and intermediate and delay working flip-flops numbered 111 through 118 and three serially connected sign indicating flip-flops 119, 121 and 122. Each set of serially connected flip-flops is labeled with the scaling factor with which data to be entered into the adder-subtracter unit by these flip-flops is to be converted. For example, the serially connected flip-flops 111 and 112 are labeled PINT 1 and INT 1, operate to develop the integrate by 1 command signal INT 1 appearing at their output. Similarly, the serially connected flip-flops 113 through 115 are labeled PINT 10, INTIO and DINT 10 and function to develop the command signals INT 10 and DINT 10. The flip-flops 116 through 118 are similarly related to develop the command signals INT 100 and DINT 100, and the sign indicating flip-flops 119, 121 and 122 develop the command signals SUB and DSUB. Each of the respective command signals is developed initially in the preliminary storage flip-flop PSUB, PINT 1, PINT 10 and PINT 100 in response to the SPS, $\overline{\text{CORR 1}}$, $\overline{\text{CORR 10}}$ and $\overline{\text{CORR 100}}$ signals supplied thereto from the count recognition gates 85, 86 and 87, respectively, of the count recognition circuit means 15 shown in FIG. 4.

The count recognition signals are supplied through a plurality of three-input OR-gates 201, 202, 203 and 204, respectively, shown in FIG. 5. The three-input OR-gate 201, for example, has its output connected to the PSUB flip-flop 119 and has supplied thereto a sign indicating signal $\overline{\text{SPS}}$ from each of the X-axis, the Y-axis and Z-axis count recognition and correction circuits of a three axis numerical machine tool control. Thus, it will be appreciated that the readout circuitry shown in FIG. 5 in fact is designed to receive and accommodate input fringe count signal pulses from three separate position gauging systems such as that previously described in connection with FIGS. 1 through 4 of the drawings with each system being assigned to process the signal for one axis of a three axis control. In a similar manner, the three-input OR-gate 202 has supplied thereto the input signal $\overline{\text{CORR 1}}$ derived from the count recognition and correction circuits of each of the X, Y and Z axes, the three-input AND-gate 203 has the input signal $\overline{\text{CORR 10}}$ from each axis supplied thereto, and the AND-gate 204 receives the $\overline{\text{CORR 100}}$ signal from each axis.

The PCR permissive signal is developed by the PINT 1, PINE 10 and PINT 100 flip-flops 111, 113 and 116, respectively, whose reset output terminals are connected directly to three of the input terminals of a four-input AND-gate 205. AND-gate 205 has its fourth input terminal connected to a $\overline{00}$ timing signal which stays in the "1" state except for the last bit time in the 100-bit operating cycle of the adder-subtractor used with the system. AND-gate 205 has its output connected back through an inverter power driver circuit 206 to supply the PCR permissive signal back to the count recognition and correction AND-gates 85, 86 and 87 shown in FIG. 4. It will be appreciated therefore that as long as the flip-flops 111, 113 and 116 are in their cleared state, AND-gate 205 will be enabled to supply a PCR permissive signal back to the count recognition circuitry 15 during the 99-bit period that $\overline{00}$ is in the "1" state. However, upon any one of the preliminary flip-flops 111, 113 or 116 being set by an input fringe count to be added to the data being processed in the circuit shown in FIG. 5, the AND-gate 205 will prevent any further recognition of the counter state, and further modification of its stored count on succeeding clock pulses is prevented due to the PCR signal going to logic "1."

During the last bit of the 100-bit operating cycle of the adder-subtracter, timing signal $\overline{00}$ is passed through a power driver inverter 207 and is applied to both the set and reset input terminals of all the intermediate flip-flops 121, 112, 114 and 117. This causes the information stored in the preliminary flip-flops 119, 111, 113 and 116 to be shifted down into the intermediate working flip-flops where it is considered active information and can actually control the operation of the adder-subtracter unit. Concurrently, this same timing signal $\overline{00}$ also clears all of the preliminary flip-flops and by making PCR=0 blocks the recognition gates 85, 86, and 87 so that no new count recognition can take place during the particular clock period in which the clearing of the preliminary flip-flops occurs. During the next successive 100 clock times while the adder-subtractor unit will be involved in reading in the new data, the preliminary flip-flops 119, 111, 113 and 116 will be made available for storing information from the buffer memory associated with a different motion axis such as the Y- or Z-axis. Hence, during the following 100-bit times, the preliminary flip-flops may again be set to read in new data from the Y-axis, for example. At the end of the next 100-bit times, the $\overline{00}$ signal will serve to shift the information in the intermediate flip-flops 121, 114 and 117 down into the delay flip-flops 122, 115 and 118, respectively, and concurrently will shift the new information stored in the preliminary flip-flops 119, 111, 113 and 116 down into the intermediate working flip-flops 121, 112, 114 and 117, in the previously described fashion.

From the foregoing description, it will be appreciated that in order to utilize the information stored in the preliminary flip-flops 119, 111, 113 and 116, the timing signal identified as $\overline{00}$ entering at the right side of FIG. 5 goes to the logic "0" state and causes the information in the preliminary flip-flops to be shifted down to the next row of intermediate working flip-flops where it is considered to be active information and actually controls the adder-subtracter by means of the signals shown as going off of the bottom of FIG. 5. The same timing signal, $\overline{00}$ also clears all of the preliminary flip-flops and blocks the recognition gates so that no recognition can take place during this particular clock period. During the 100 clock times in which the arithmetic operation is actually being carried out by the adder-subtracter unit, the preliminary flip-flops are available for storing information from another different motion axis. Since the arithmetic operation of the adder-subtracter unit actually occupies two groups of 100-bit clock times for completion, the state of the intermediate working flip-flops whose outputs control the second half of the arithmetic operation. During the second half of the first axis arithmetic operation, second axis commands which have been shifted down from preliminary flip-flops to the active intermediate working flip-flops, control the adder-subtracter to perform the second axis arithmetic operation on a time-shared basis. The manner in which the command signals shown below the row of delayed flip-flops 122, 115 and 118 are utilized in the adder-subtracter to carry out the actual arithmetic operation is described more fully in the above-identified copending application Ser. No. 709,433.

From the foregoing description, it will be appreciated that the invention makes available a new and improved buffer memory that is capable of accumulating the preprocessed, variable rate, reversible polarity fringe count signal pulses of an interferometer or other gauging device in a reversible counter that can count up and back down and deliver a net sum to a readout circuit indicative of the total accumulated count at a particular instant of time. The buffer memory also is capable of delivering at its output, signal pulses representative of units of input fringe count pulses or other prearranged groups of input fringe count pulses such as 10 or 100 pulses at a time together with a signal indicating that the constant should be shifted one or two places when appropriate (based on the contents of the reversible counter) so as to enable the digital equipment which it supplies to process single input pulses, or 10 or 100 input pulses at a time. In addition, the memory includes means for appropriately correcting the count contained in the reversible counter subsequent to reading out 1, 10 or 100 accumulated input fringe count pulses, in order that the contents of the counter correctly represent only the remaining unprocessed input pulses.

Having described one embodiment of a new and improved buffer memory constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What is claimed as new and desired to be secured by Letters Patent of the United States is:

1. A digital buffer memory for accumulating the variable rate, reversible polarity, digital fringe count signal pulses of an interferometer position gauging device comprising a digitally operable, reversible decade counter for accumulating a count indicative of the net sum of the input fringe count pulses supplied thereto, count recognition circuit means coupled to said decade counter for classifying the count accumulated in the counter as being within a block measured by units, tens or hundreds, means coupled to the count recognition circuit means for providing a signal defining the block classified as being within the units, tens, or hundreds range as determined by the counter recognition circuit means, and count correction feedback circuit means responsive to the signal defining the block classified by the count recognition circuit means and coupled back to the counter for correspondingly correcting the count registered therein by units, tens or hundreds.

2. A digital buffer memory according to claim 1 further including positive and negative sign indicating logic circuit means responsive to the variable rate, reversible polarity fringe count signal pulses for indicating whether the fringe count signal pulses are to be added or subtracted from the contents of the reversible decade counter.

3. A digital buffer memory according to claim 2 wherein said positive and negative sign indicating logic circuit means further includes means responsive to the count accumulated in the reversible counter for indicating whether the count corresponding to said signal is to be added or subtracted by the digital processing equipment supplied from the digital buffer memory.

4. A digital buffer memory according to claim 3 further including count inhibiting means coupled to said count recognition circuit means and responsive to the variable rate digital input for inhibiting operation of said count recognition circuit means during application of the variable rate digital input to the digitally operable counter.

5. A digital buffer memory according to claim 4 further including enabling means coupled to said count recognition circuit means and responsive to enabling signals from the digital processing equipment with which the buffer memory is used for enabling the count recognition circuit means to provide said signal at predetermined times in the operation of the digital processing equipment.

6. A digital buffer memory for accommodating a variable rate digital input to digital processing equipment comprising a digitally operable counter for accumulating the input variable rate digital input as a numerical representation of said count expressed in a given radix system, count recognition circuit means coupled to said counter for recurrently classifying the count accumulated therein as being within one of a plurality of blocks, wherein each block represents all of the counts falling within respectively different, nonoverlapping ranges of counts, means responsive to said classification for recurrently providing an output signal indicative only of the digit position of the most significant digit in said numerical representation, means for utilizing said output signal, and count correction feedback circuit means timed with respect to the utilization of said output signal for correcting the count registered in said counter in accordance with the value of the size of the count corresponding to the utilized output signal.

7. An arrangement for processing fringe count pulses from an interferometer position gauging device comprising a reversible digital counter for accumulating a count indicative of the sum of the input fringe pulses produced in a given period of time, classifying means coupled to said counter for classifying the count accumulated in the counter as being within one block of a plurality of blocks respectively measured by units, tens or hundreds, means coupled to said classifying means for providing a signal defining the count classified as being in the units, tens or hundreds block range as determined by said classifying means, and means responsive to said signal for correspondingly correcting the count registered in said counter by units, tens or hundred.

8. In combination a digital register for serially accepting recurrent input pulses indicative of input counts of equal significance and for storing said input counts as a numerical representation of the accumulated count expressed in an appropriate radix system, count recognition means coupled to said digital register for classifying the count accumulated therein within one of a plurality of blocks of counts of respectively different, nonoverlapping ranges, said count recognition means responsive to said classification for providing an output signal indicative of the digit position of the most significant nonzero digit in said numerical representation of said accumulated count, means for performing a subsequent computational operation, means responsive to said output signal for executing a corresponding modification in said subsequent computational operation commensurate with the significance of said most significant nonzero digit bit position, count correction means responsive to the ordered execution of said modified computational operation to modify the value of said most significant nonzero digit by an amount appropriate to said execution of said modified computational operation.

9. An arrangement according to claim 8 wherein said subsequent computational operation comprises adding the value of a given constant to an existing number.

10. An arrangement according to claim 9 wherein the modification to the subsequent computational operation comprises modification of said given constant.

11. An arrangement according to claim 10, wherein the modification of said constant comprises multiplying it by the value represented by the least significant digit in the most significant nonzero digit of the count accumulated in said counter.

12. An arrangement according to claim 8 wherein said digital register is a binary counter and said appropriate radix system is a binary system.

13. An arrangement in accordance with claim 12 wherein said digital register is a binary coded decimal counter and said appropriate radix system is a decimal system.

14. In combination a digital register for serially accepting recurrent input pulses indicative of input counts of equal significance and for storing said input counts as a numerical representation of the accumulated count expressed in an appropriate radix system, count recognition means coupled to said digital register for classifying the count accumulated therein within a plurality of blocks of counts of different sizes, said different size blocks having populations equal to the number corresponding to the value of the smallest nonzero digit in each of the nonzero populated digit positions of said numerical representation, said count recognition means providing an output signal indicative of the digit position of the most significant nonzero digit in said numerical representation of said accumulated count, means for performing a subsequent computational operation, means responsive to said output signal for executing a corresponding modification in said subsequent computational operation commensurate with the significance of said most significant nonzero digit bit position, count correction means responsive to the ordered execution of said modified computational operation to modify the value of said most significant nonzero digit stored in said digital register without modifying the values of any other digits stored in said digital register by an amount appropriate to said execution of said modified computational operation.

15. A digital buffer memory for accommodating a variable rate digital input to digital processing equipment comprising a digitally operable counter for accumulating the input variable rate digital input as a numerical representation of said count expressed in a given radix system, count recognition circuit means coupled to said counter for recurrently classifying the count accumulated therein as being within one of a plurality of blocks, wherein each block represents all of the counts falling within respectively different, nonoverlapping ranges of counts, means responsive to said classification for recurrently providing an output signal indicative only of the digit position of the most significant digit in said numerical representation, means for utilizing said output signal, count correction feedback circuit means timed with respect to the utilization of said output signal for correcting the count registered in said counter in accordance with the value of the size of the count corresponding to the utilized output signal, said digitally operable counter comprises a reversible counter, and further including positive and negative sign indicating logic circuit means responsive to the variable rate digital input to be accumulated for indicating whether the variable rate digital input is to be added or subtracted from the contents of the reversible counter.

16. A digital buffer memory according to claim 15 wherein said positive and negative sign indicating logic circuit means further includes means responsive to the count accumulated in the reversible counter for indicating whether the count corresponding to said output signal is to be added or subtracted by the digital processing equipment supplied from the digital buffer memory.

17. A digital buffer memory according to claim 16 further including count inhibiting means coupled to said count recognition circuit means and responsive to the variable rate digital input for inhibiting operation of said count recognition circuit means and said utilizing means during application of the variable rate digital input to the digitally operable counter and readout enabling means coupled to said count recognition circuit means and responsive to enabling signals from the digital processing equipment with which the buffer memory is used for enabling the count recognition circuit means to indicate the count accumulated in the counter at predetermined times in the operation of the digital processing equipment.

18. A digital buffer memory for accommodating a variable rate digital input to digital processing equipment comprising a digitally operable counter for accumulating the input variable rate digital input as a numerical representation of said count expressed in a given radix system, count recognition circuit means coupled to said counter for recurrently classifying the count accumulated therein as being within one of a plurality of blocks, wherein each block represents all of the counts falling within respectively different, nonoverlapping ranges of counts, means responsive to said classification for recurrently providing an output signal indicative only of the digit position of the most significant digit in said numerical representation, means for utilizing said output signal, count correction feedback circuit means timed with respect to the utilization of said output signal for correcting the count registered in said counter in accordance with the value of the size of the count corresponding to the utilized output signal, and count inhibiting means coupled to said count recognition circuit means and responsive to the variable rate digital input for inhibiting operation of said count recognition circuit means and said utilizing means during application of the variable rate digital input to the digitally operable counter.

19. A digital buffer memory for accommodating a variable rate digital input to digital processing equipment comprising a digitally operable counter for accumulating the input variable rate digital input as a numerical representation of said count expressed in a given radix system, count recognition circuit means coupled to said counter for recurrently classifying the count accumulated therein as being within one of a plurality of blocks, wherein each block represents all of the counts falling within respectively different, nonoverlapping ranges of counts, means responsive to said classification for recurrently providing an output signal indicative only of the digit position of the most significant digit in said numerical representation, means for utilizing said output signal, count correction feedback circuit means timed with respect to the utilization of said output signal for correcting the count registered in said counter in accordance with the value of the size of the count corresponding to the utilized output signal, and readout enabling means coupled to said count recognition circuit means and responsive to enabling signals from the digital processing equipment with which the buffer memory is used for enabling the count recognition circuit means to indicate the count accumulated in the counter at predetermined times in the operation of the digital processing equipment.

* * * * *

UNITED STATES PATENT OFFICE
CERTIFICATE OF CORRECTION

Patent No. 3,627,996 Dated December 14, 1971

Inventor(s) Hervey E. Vigour

It is certified that error appears in the above-identified patent and that said Letters Patent are hereby corrected as shown below:

Column 1, line 29, "occuring" should be -- occurring --; Column 3, line 49, "adder-subtractor" should be -- adder-subtracter --, line 70, "filp-flops" should be -- flip-flops --; Column 7, line 28, " A" should be -- LA --, line 29, " B" should be -- LB --, line 30, "terminal" should be -- terminals --, line 44, " A" should be -- LA -- and " B" should be -- LB --, line 59, " A and B" should be -- LA and LB --; Column 9, line 19, "content" should be -- contents --; Column 10, line 30, "his" should be -- this --; Column 11, line 27, "OR-ate" should be -- OR-gate --; Column 14, line 5, After "flip-flops" insert -- is shifted down to the next row of delayed action flip-flops --.

Signed and sealed this 27th day of February 1973.

(SEAL)
Attest:

EDWARD M. FLETCHER, JR.
Attesting Officer

ROBERT GOTTSCHALK
Commissioner of Patents